United States Patent
Seo

(10) Patent No.: US 11,933,414 B2
(45) Date of Patent: Mar. 19, 2024

(54) FLOATING VALVE FOR AIR VENTILATION

(71) Applicants: Hyundai Motor Company, Seoul (KR); Kia Corporation, Seoul (KR)

(72) Inventor: Jungmin Seo, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/835,621

(22) Filed: Jun. 8, 2022

(65) Prior Publication Data

US 2023/0025251 A1 Jan. 26, 2023

(30) Foreign Application Priority Data

Jul. 21, 2021 (KR) .......................... 10-2021-0095791

(51) Int. Cl.
*F16K 24/04* (2006.01)
*B60K 11/02* (2006.01)

(52) U.S. Cl.
CPC ............. *F16K 24/046* (2013.01); *B60K 11/02* (2013.01)

(58) Field of Classification Search
CPC ....... B60K 11/02; F16K 24/046; F16K 31/22; F16K 27/0232; F16K 27/0245; F16K 15/04
See application file for complete search history.

(56) References Cited

U.S. PATENT DOCUMENTS

| | | | | |
|---|---|---|---|---|
| 1,698,990 A | * | 1/1929 | Derryberry | F16K 24/046 137/202 |
| 1,901,217 A | * | 3/1933 | Yerkes | F16K 15/04 137/515 |
| 2,129,254 A | * | 9/1938 | Wood | F28F 9/0231 123/41.03 |
| 2,589,581 A | * | 3/1952 | Sokolik | F16K 15/04 137/533.13 |
| 2,919,707 A | * | 1/1960 | Seidler | F16K 24/042 137/39 |
| 4,052,965 A | * | 10/1977 | Morris | F01P 7/16 137/433 |
| 4,489,744 A | * | 12/1984 | Merrill | F16K 24/046 137/433 |

(Continued)

FOREIGN PATENT DOCUMENTS

CN 111006045 A * 4/2020
DE 3812549 A1 * 10/1989
(Continued)

*Primary Examiner* — Hailey K. Do
(74) *Attorney, Agent, or Firm* — MORGAN, LEWIS & BOCKIUS LLP

(57) ABSTRACT

A floating valve for air ventilation mounted in a vent hose connected to a surge tank of a vehicle cooling system includes: an upper port including a first hollow, wherein an upper end portion of the first hollow is connected to the vent hose; a lower port including a second hollow, wherein a lower end portion of the second hollow is connected to the vent hose at a location facing the upper port; a structure portion provided to connect the upper port and the lower port to each other in fluidical communication with the upper port and the lower port; and a floating ball provided to be movable inside the structure portion so that the floating ball floats to seal an opening of the first hollow in the upper port when cooling fluid flows into the structure portion.

10 Claims, 8 Drawing Sheets

(56) References Cited

U.S. PATENT DOCUMENTS

| | | | | |
|---|---|---|---|---|
| 4,785,484 | A * | 11/1988 | Sargent | A61H 33/60 |
| | | | | 137/202 |
| 4,945,947 | A * | 8/1990 | Westra | F16K 15/04 |
| | | | | 137/519.5 |
| 5,275,196 | A * | 1/1994 | Mitchell | F16K 17/02 |
| | | | | 137/224 |
| 5,435,335 | A * | 7/1995 | Klop | F16K 24/046 |
| | | | | 137/433 |
| 5,579,803 | A * | 12/1996 | Welker | F16K 24/046 |
| | | | | 137/202 |
| 5,762,093 | A * | 6/1998 | Whitley, II | B60K 15/03519 |
| | | | | 137/202 |
| 5,791,374 | A * | 8/1998 | Black | F02M 61/04 |
| | | | | 137/533.15 |
| 9,903,503 | B2 * | 2/2018 | Kelly | F16K 1/14 |
| 11,125,349 | B1 * | 9/2021 | Samayamantula | E21B 34/08 |
| 11,187,341 | B2 * | 11/2021 | Ford | F16K 27/0209 |
| 11,428,336 | B2 * | 8/2022 | O'Neill | F16K 27/0245 |
| 2004/0159243 | A1 * | 8/2004 | Theodos | A47J 37/1285 |
| | | | | 99/330 |
| 2006/0283505 | A1 * | 12/2006 | Makowan | F16K 24/046 |
| | | | | 137/388 |
| 2009/0223574 | A1 * | 9/2009 | Montague | F16K 15/048 |
| | | | | 137/519.5 |
| 2010/0132805 | A1 * | 6/2010 | Kshirsagar | F16K 24/046 |
| | | | | 137/202 |
| 2019/0338861 | A1 * | 11/2019 | Otterbein | F16K 27/0245 |

FOREIGN PATENT DOCUMENTS

| | | | | |
|---|---|---|---|---|
| DE | 19501725 | A1 * | 8/1995 | B29C 47/0815 |
| DE | 202006016785 | U1 * | 3/2007 | A61M 39/24 |
| DE | 102017003777 | A1 * | 10/2017 | F01M 11/04 |
| FR | 2847648 | A1 * | 5/2004 | F16K 24/046 |
| KR | 20220134965 | A * | 10/2022 | |
| WO | WO-2021089645 | A1 * | 5/2021 | F16K 15/04 |

* cited by examiner

FLOATING VALVE FOR AIR VENTILATION

CROSS-REFERENCE TO RELATED APPLICATION

The present application claims priority to Korean Patent Application No. 10-2021-0095791 filed on Jul. 21, 2021, the entire contents of which is incorporated herein for all purposes by this reference.

BACKGROUND OF THE PRESENT DISCLOSURE

Field of the Present Disclosure

The present disclosure relates to a floating valve for air ventilation. More particularly, the present disclosure relates to a floating valve for air ventilation mounted in a vent hose connected to a surge tank of a vehicle cooling system.

Description of Related Art

In designing a vehicle cooling system, coolant injection performance and air ventilation performance are important factors for vehicle maintenance. To the present end, as illustrated in FIG. 1, a floating valve for air ventilation is mounted in the vehicle cooling system.

When a coolant pump 200 operates, coolant stored in a surge tank 300 is circulated to pass through parts to be cooled, such as a radiator 400, an inverter 500, and a motor 600. However, when the coolant pump 200 operates, some of coolant discharged out of the coolant pump 200 flows into the surge tank through a floating valve 100 for air ventilation, resulting in a decrease in flow rate of coolant flowing into the inverter 500 and the motor 600. Each of the parts to be cooled has a standard for a required flow rate in consideration of cooling performance. To satisfy such a standard, the coolant pump needs to be designed to rotate at a higher revolutions per minute (RPM) in consideration of a loss in coolant flow rate caused by the floating valve for air ventilation.

This phenomenon is more pronounced in environment-friendly vehicles (electric vehicles and hydrogen vehicles). If a height of a cooling line varies between several places due to a vehicle package, a number of floating valves for air ventilation are provided, and as a result, the above-described coolant loss problem becomes severe.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a floating valve for air ventilation mounted in a vent hose connected to a surge tank, the floating valve having advantages of blocking the flow of coolant into a surge tank when the coolant flows into the vent hose.

Various aspects of the present disclosure are directed to providing a floating valve for air ventilation mounted in a vent hose connected to a surge tank of a vehicle cooling system, the floating valve including: an upper port including a first hollow, wherein an upper end portion of the first hollow is connected to the vent hose; a lower port including a second hollow, wherein a lower end portion of the second hollow is connected to the vent hose at a location facing the upper port; a structure portion provided to connect the upper port and the lower port to each other in fluidical communication with the upper port and the lower port; and a floating ball provided to be movable inside the structure portion so that the floating ball floats to seal an opening of the first hollow in the upper port when cooling fluid flows into the structure portion.

The structure portion may include: an upper structure portion, wherein an upper end portion of the upper structure is integrally formed with the upper port to fluidically communicate with the upper port; and a lower structure portion, wherein a lower end portion of the lower structure portion is integrally formed with the lower port to fluidically communicate with the lower port.

The structure portion may be provided in a hollow cylindrical shape.

The inside of the upper structure portion may be formed in a shape of a cone including a predetermined inclination while extending from the first hollow of the upper port.

The inside of the lower structure portion may be provided with a seating portion to allow the floating ball to be accommodated on the seating portion and provide a space through which the lower port and the lower structure portion fluidically communicate with each other.

The seating portion may be formed in a symmetrical shape.

The floating ball may be formed in a shape of a sphere.

A surface of the floating ball may be made of an elastic material.

The floating ball may be made of a material having a smaller specific gravity than the cooling fluid.

The upper port may have an upper end portion formed in a tapered shape to be narrower upward, and the lower port may have a lower end portion formed in a tapered shape to be narrower downward.

According to an exemplary embodiment of the present disclosure, a loss in coolant flow rate may be minimized in the cooling system of the commercial environment-friendly vehicle, satisfying a standard for a required flow rate of a part to be cooled and improving cooling performance.

Furthermore, the minimization of the loss in coolant flow rate also makes it possible to reduce revolutions per minute (RPM) of a cooling fan during operation, resulting in an improvement in durability and a reduction in noise, vibration, and harshness (NVH).

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
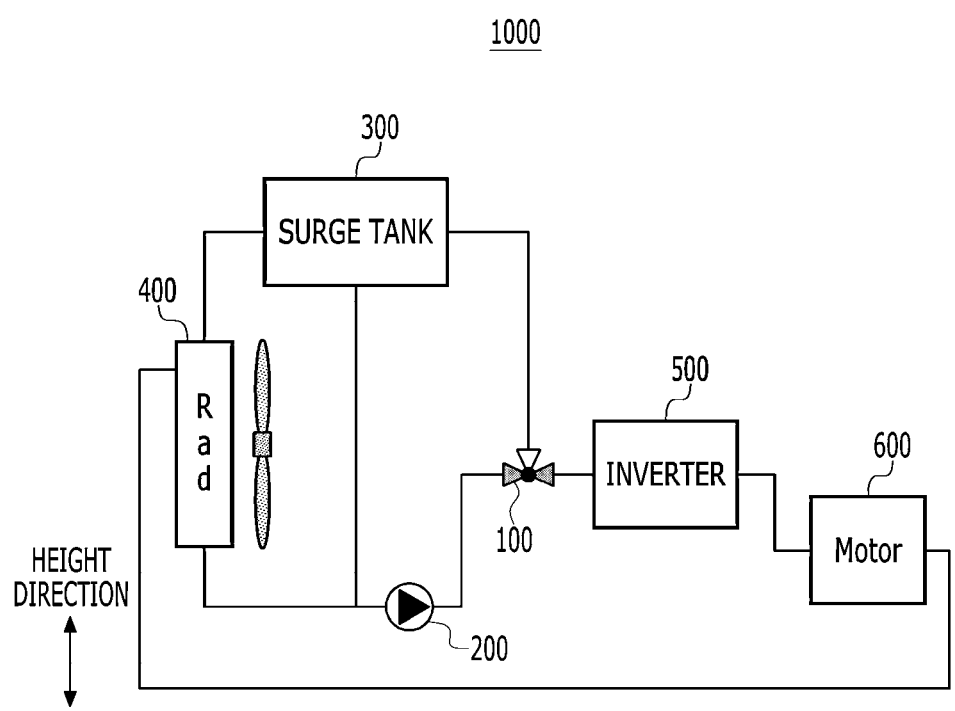
FIG. 1 is a view schematically illustrating a vehicle cooling system to which a floating valve for air ventilation is applied according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings so that they may be easily conducted by those of ordinary skill in the art to which an exemplary embodiment of the present disclosure pertains. The present disclosure may be implemented in various different forms and is not limited to the exemplary embodiments described herein.

Furthermore, in describing various exemplary embodiments of the present disclosure, the same configuration will be representatively described in an exemplary embodiment using like reference numerals for like components, and only configurations different from those in the exemplary embodiment will be described in the other exemplary embodiments of the present disclosure.

It shall be noted that the drawings are schematic and do not depict exact dimensions. The relative proportions and ratios of elements in the drawings may be exaggerated or diminished in size for the sake of clarity and convenience in the drawings, and such arbitrary proportions are only illustrative and not limiting. Like reference numerals are used for like structures, elements, or parts shown in two or more drawings to show similar characteristics. When one part is referred to as being "over" or "on" another part, the one part may be directly over or on the other part or there may be an intervening part therebetween.

The exemplary embodiment of the present disclosure shows various exemplary embodiments of the present disclosure in detail. As a result, various modifications of the drawings are expected. Therefore, the exemplary embodiment of the present disclosure is not limited to a specific aspect of the illustrated region, and for example, includes modifications of an aspect by manufacturing.

Hereinafter, a floating valve for air ventilation according to various exemplary embodiments of the present disclosure will be described with reference to FIG. 2 and FIG. 3.

Figure 2:
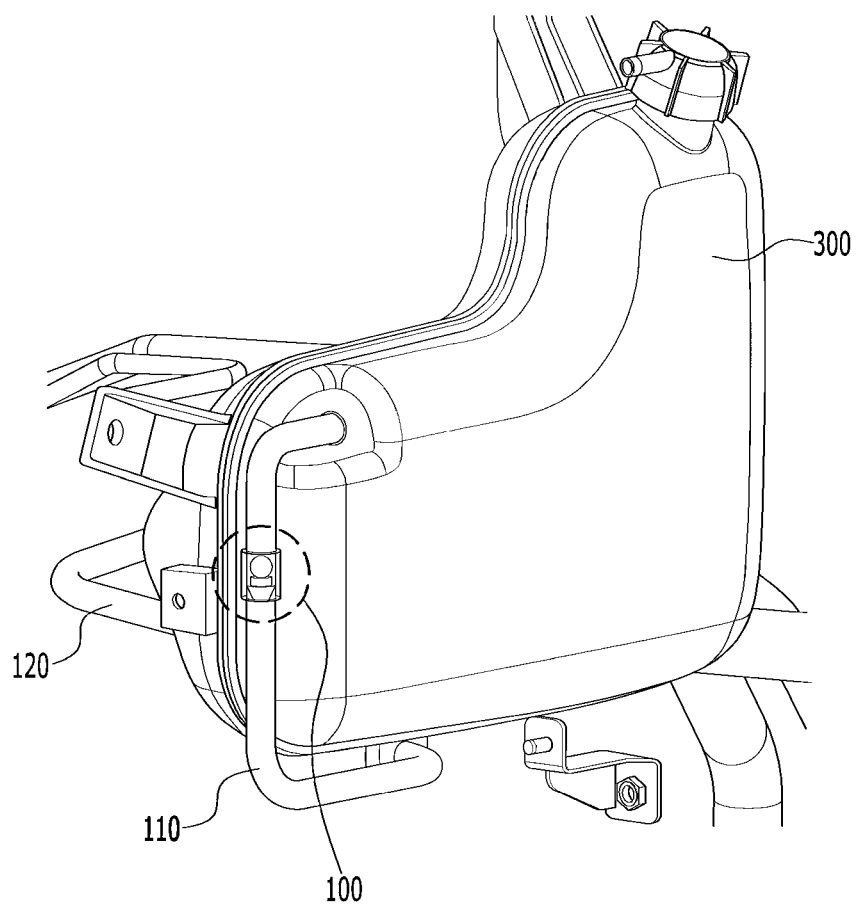
FIG. 2 is a view exemplarily illustrating a state in which the floating valve for air ventilation according to various exemplary embodiments of the present disclosure is mounted in a vent hose connected to a surge tank of the vehicle cooling system.
Figure 3:
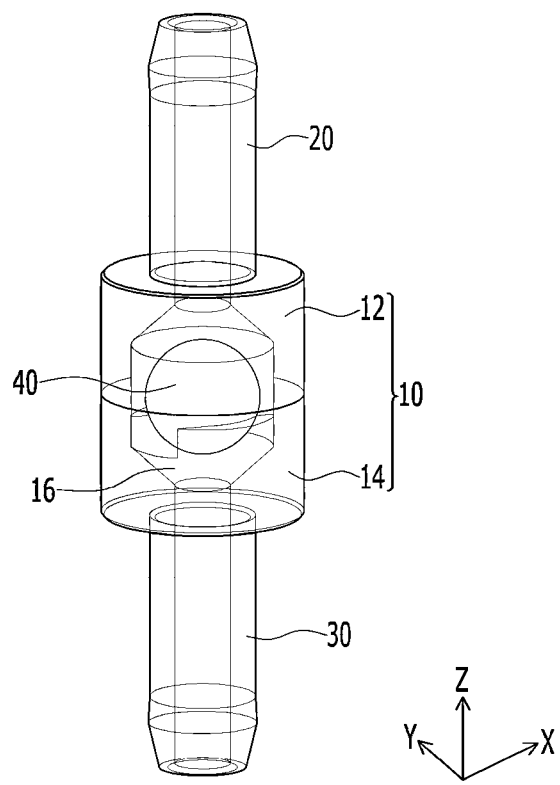
FIG. 3 is a view schematically illustrating the floating valve for air ventilation according to various exemplary embodiments of the present disclosure.

FIG. 2 is a view exemplarily illustrating a state in which a floating valve for air ventilation according to various exemplary embodiments of the present disclosure is mounted in a vent hose connected to a surge tank of a vehicle cooling system, and FIG. 3 is a view schematically illustrating the floating valve for air ventilation according to various exemplary embodiments of the present disclosure.

Referring to FIG. 2, a vent hose 110 is connected to one side of a surge tank 300 filled with coolant, and a hose pipe 120 connected to a coolant pump 200 is provided on the other side of the surge tank 300. The vent hose 110 may be connected to the surge tank 300 to continue from an upper side to a lower side of the surge tank 300, and a floating valve 100 for air ventilation according to various exemplary embodiments of the present disclosure may be mounted at a center portion of the vent hose 110. That is, the floating valve 100 for air ventilation may be mounted so that the vent hose 110 is vertically connected thereto in the direction of gravity. Furthermore, the floating valve 100 for air ventilation opens the surge tank 300 to vent air remaining in the pipe when cooling fluid (coolant) does not flow, and closes the surge tank 300 when the cooling fluid flows.

Referring to FIG. 3, the floating valve 100 for air ventilation according to various exemplary embodiments of the present disclosure may include an upper port 20, a lower port 30, a structure portion 10, and a floating ball 40.

The upper port 20 may have a hollow, and an upper end portion thereof may be formed in a tapered shape to be narrower upwards. The upper port 20 may be fitted into the vent hose 110 at a location corresponding to an upper portion of the floating valve 100 for air ventilation.

The lower port 30 is provided at a location facing the upper port 20, and a lower end portion thereof may be formed in a tapered shape to be narrower downward. The lower port 30 may be fitted into the vent hose 110 at a location corresponding to a lower portion of the floating valve 100 for air ventilation.

Thus, in a state where the floating valve 100 for air ventilation is connected to the vent hose 110, only the structural portion 10 may be externally exposed as illustrated in FIG. 2.

The structure portion 10 may be provided to connect the upper port 20 and the lower port 30 to each other in fluidical communication with the upper port 20 and the lower port 30.

The structure portion 10 may be formed in a hollow cylindrical shape, and may include an upper structure portion 12 whose upper end portion is integrally formed with the upper port 20 to fluidically communicate with the upper port 20, and a lower structure portion 14 whose lower end portion is integrally formed with the lower port 30 to fluidically communicate with the lower port 30.

The floating ball 40 may be accommodated on a seating portion 16 provided inside the lower structure portion 14, and may be vertically movable to float when the cooling fluid flows into the structure portion 10.

Figure 4:
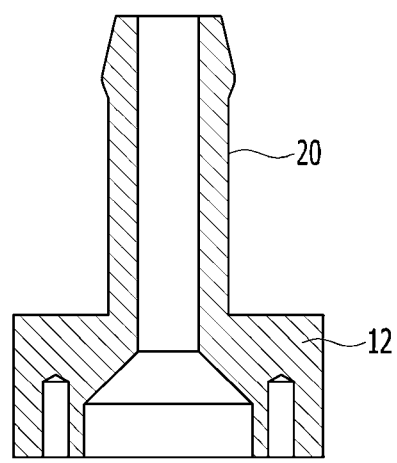
FIG. 4 is a cross-sectional view exemplarily illustrating an upper port and an upper structure portion of the floating valve for air ventilation according to various exemplary embodiments of the present disclosure when viewed in an X direction.
Figure 5:
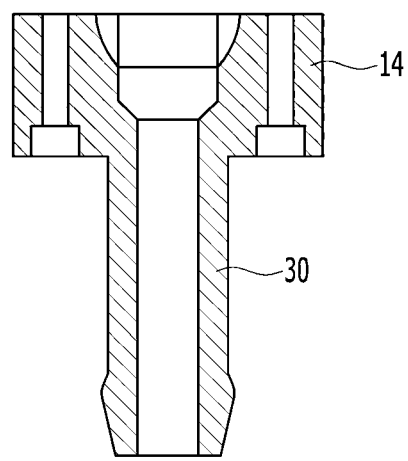
FIG. 5 is a cross-sectional view exemplarily illustrating the X direction of a lower port and a lower structure portion of the floating valve for air ventilation according to various exemplary embodiments of the present disclosure when viewed in the X direction.

FIG. 4 is a cross-sectional view exemplarily illustrating the upper port and the upper structure portion of the floating valve for air ventilation according to various exemplary embodiments of the present disclosure when viewed in an X direction, and FIG. 5 is a cross-sectional view exemplarily illustrating the X direction of the lower port and the lower structure portion of the floating valve for air ventilation according to various exemplary embodiments of the present disclosure when viewed in the X direction.

As illustrated in FIG. 4, the inside of the upper structure portion 12 may be formed in a shape of a cone including a predetermined inclination while extending from the hollow of the upper port 20. Furthermore, as illustrated in FIG. 5, the inside of the lower structure portion 14 may be provided with the seating portion 16 to allow the floating ball 40 to be accommodated thereon and provide a space through which the lower port 30 and the lower structure portion 14 communicate with each other.

Figure 6:
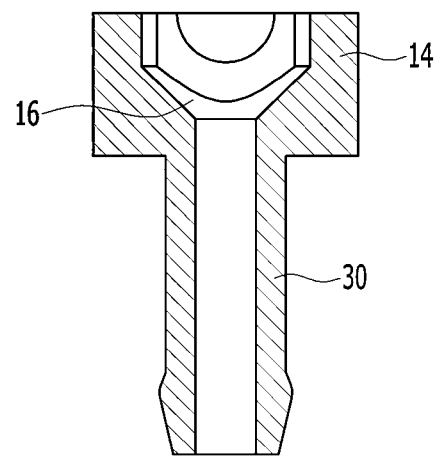
FIG. 6 is a cross-sectional view exemplarily illustrating the lower port and the lower structure portion of the floating valve for air ventilation according to various exemplary embodiments of the present disclosure when viewed in a Y direction.
Figure 7:
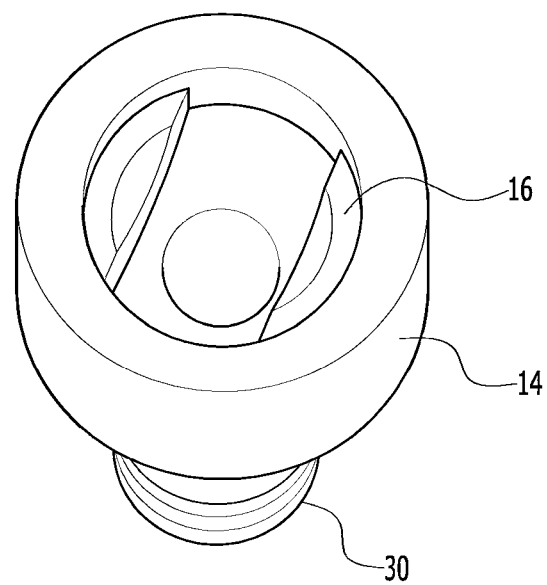
FIG. 7 is a perspective view exemplarily illustrating the lower port and the lower structure portion of the floating valve for air ventilation according to various exemplary embodiments of the present disclosure when viewed from above.

FIG. 6 is a cross-sectional view exemplarily illustrating the lower port and the lower structure portion of the floating valve for air ventilation according to various exemplary embodiments of the present disclosure when viewed in a Y direction, and FIG. 7 is a perspective view exemplarily illustrating the lower port and the lower structure portion of the floating valve for air ventilation according to various exemplary embodiments of the present disclosure when viewed from above.

As illustrated in FIG. 6 and FIG. 7, the seating portion 16 may be formed in a symmetrical shape. Furthermore, the seating portion 16 may be formed in a shape corresponding to an external surface of the floating ball 40 so that the floating ball 40 is accommodated thereon. Such a shape makes it possible to keep the floating ball 40 stably accommodated on the seating portion 16 when air moves inside the structure portion 10, preventing the floating ball 40 from being biased toward one side thereof.

Figure 8:
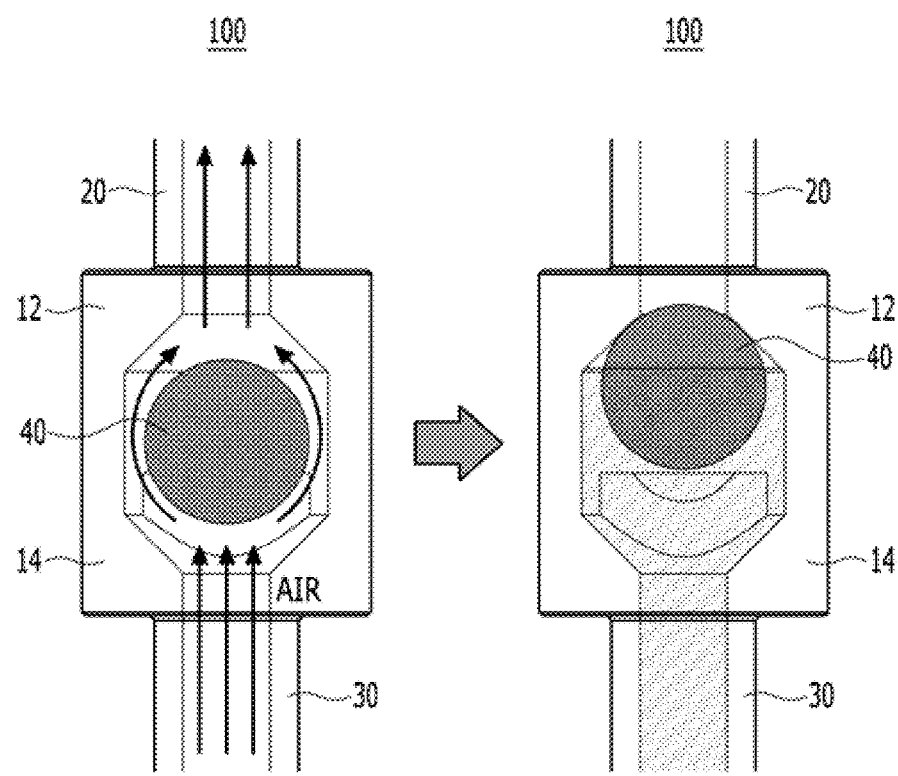
FIG. 8 is a view exemplarily illustrating operation states of the floating valve for air ventilation according to various exemplary embodiments of the present disclosure.

FIG. 8 is a view exemplarily illustrating operation states of the floating valve for air ventilation according to various exemplary embodiments of the present disclosure.

Referring to FIG. 8, the floating ball 40 may be formed in a shape of a sphere. In a state where the cooling fluid does not flow into the structure portion 10, the air may be discharged out of the upper port 20 from the lower port 30 through the structure portion 10. In the instant case, the floating ball 40 is accommodated on the seating portion 16 provided in the lower structure portion 14 by gravity, and the seating portion 16 may form a passage allowing the air to pass therethrough between the floating ball 40 and an internal wall of the structure portion 10. The air flowing into the structure portion 10 from the lower port 30 through the present passage may be discharged out of the upper port 20.

When the cooling fluid flows into the structure portion 10 from the lower port 30, the floating ball 40 moves toward the upper port 20 by buoyancy, and tightly adheres to the cone-shaped region formed to have the predetermined inclination in the upper structure portion 12. Therefore, the cooling fluid may be prevented from flowing toward the upper port 20, and accordingly, the coolant may be prevented from being leaked to the surge tank 300 connected to the upper port 20. In the instant case, a surface of the floating ball 40 may be made of an elastic material so that a gap is not formed when the floating ball 40 tightly adheres to the cone-shaped region of the upper structure portion 12. For example, the surface of the floating ball 40 may be made of a thin rubber. Furthermore, the floating ball 40 may be made of a material having a smaller specific gravity than the cooling fluid so that the floating ball 40 floats by buoyancy.

As described above, according to an exemplary embodiment of the present disclosure, a loss in coolant flow rate may be minimized in the cooling system of the commercial environment-friendly vehicle, satisfying a standard for a required flow rate of a part to be cooled and improving cooling performance.

The minimization of the loss in coolant flow rate also makes it possible to reduce revolutions per minute (RPM) of a cooling fan during operation, resulting in an improvement in durability and a reduction in noise, vibration, and harshness (NVH).

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A floating valve mounted in a vent hose connected to a surge tank of a vehicle cooling system for air ventilation, the floating valve comprising:
    an upper port including a first hollow, wherein an upper end portion of the first hollow is connected to the vent hose;
    a lower port including a second hollow, wherein a lower end portion of the second hollow is connected to the vent hose at a location facing the upper port;
    a structure portion provided to connect the upper port and the lower port to each other in fluidical communication with the upper port and the lower port; and
    a floating ball provided to be movable inside the structure portion so that the floating ball floats to seal an opening of the first hollow in the upper port when cooling fluid flows into the structure portion,
    wherein the structure portion includes a lower structure portion, and an inside of the lower structure portion is provided with a seating portion to allow the floating ball to be accommodated on the seating portion and provide a space through which the lower port and the lower structure portion fluidically communicate with each other, wherein the seating portion is formed in a shape corresponding to an external surface of the floating ball so that the floating ball is accommodated thereon, and wherein the seating portion consists of two parts formed in a symmetrical shape such that in a state that the floating ball is seated on the seating portion, air passes through the passage between the floating ball and the inner wall of the lower structure portion.

2. The floating valve of claim 1, wherein the seating portion is formed in a symmetrical shape.

3. The floating valve of claim 1, wherein the floating ball is formed in a shape of a sphere.

4. The floating valve of claim 1, wherein a surface of the floating ball is made of an elastic material.

5. The floating valve of claim 1, wherein the floating ball is made of a material having a smaller specific gravity than the cooling fluid.

6. The floating valve of claim 1, wherein the upper port has an upper end portion formed in a tapered shape to be narrower upward, and the lower port has a lower end portion formed in a tapered shape to be narrower downward.

7. The floating valve of claim 1, wherein the structure portion further includes:
   an upper structure portion, wherein an upper end portion of the upper structure portion is integrally formed with the upper port to fluidically communicate with the upper port; and
   the lower structure portion, wherein a lower end portion of the lower structure portion is integrally formed with the lower port to fluidically communicate with the lower port.

8. The floating valve of claim 7, wherein the structure portion is provided in a hollow cylindrical shape.

9. The floating valve of claim 7, wherein an inside of the upper structure portion is formed in a shape of a cone including a predetermined inclination while extending from the first hollow of the upper port.

10. The floating valve of claim 7, wherein the inside of the lower structure portion is provided with the seating portion which forms a passage allowing an air to pass therethrough between the floating ball and an internal wall of the structure portion.

* * * * *